(12) United States Patent
Haven

(10) Patent No.: US 6,179,542 B1
(45) Date of Patent: Jan. 30, 2001

(54) KNEELING DOLLY WITH RAMP BRAKE

(76) Inventor: Edward S. Haven, P.O. Box 756, Edgewater, FL (US) 32132

(*) Notice: Under 35 U.S.C. 154(b), the term of this patent shall be extended for 0 days.

(21) Appl. No.: 09/268,288

(22) Filed: Mar. 15, 1999

Related U.S. Application Data (63) Continuation-in-part of application No. 08/715,717, filed on Sep. 19, 1996, now abandoned.

(51) Int. Cl.⁷ .................................................. B60B 30/10
(52) U.S. Cl. .......................... 414/428; 414/430; 414/427; 414/476; 414/800; 280/43.2; 280/79.4
(58) Field of Search .................................. 414/800, 426, 414/427, 428, 429, 430, 589; 280/43, 43.17, 43.2, 79.4; 254/8 C, 8 R, 3 R, 3 C (56) References Cited

U.S. PATENT DOCUMENTS

| | | | |
|---|---|---|---|
| 1,343,650 | * 6/1920 | Snyder | 414/427 |
| 2,502,309 | 3/1950 | Byrd . | |
| 2,971,769 | 2/1961 | Gaddis . | |
| 3,033,398 | * 5/1962 | Carroll | 414/476 |
| 3,224,611 | * 12/1965 | Smuck | 414/430 |
| 4,045,041 | 8/1977 | Risser et al. . | |
| 4,664,398 | * 5/1987 | Mozer | 414/476 X |
| 5,248,235 | * 9/1993 | Poten et al. | 414/430 |

* cited by examiner

Primary Examiner—Frank E. Werner
(74) Attorney, Agent, or Firm—Paul S. Rooy (57) ABSTRACT

A kneeling dolly with ramp brake and method of use. Each kneeling dolly with ramp brake comprises a body having a ramp adjacent a wheel well, two front wheels swivellably and retractably attached to the body, and at least one rear wheel. Devices for extending and retracting the front wheels are provided. The instant kneeling dolly with ramp brake may be used singly, in pairs, or in whatever grouping(s) desired. In operation, a vehicle is rolled onto kneeling dollies with ramp brake, until one vehicle wheel is disposed on a respective kneeling dolly with ramp brake. Due to the swivellable attachment of the front and rear wheels, each kneeling dolly with ramp brake is free to travel in any desired direction, and thus the vehicle supported by the kneeling dollies with ramp brake may be pushed in any direction. This flexibility in movement helps relieve congestion and maximize floor space in garages, hangars, etc.

11 Claims, 5 Drawing Sheets

KNEELING DOLLY WITH RAMP BRAKE

BACKGROUND OF THE INVENTION

This utility patent application is a Continuation In Part of U.S. utility patent application Ser. No. 08/715,717 filed Sep. 19, 1996, now abandoned and accordingly Applicant claims priority under 35 U.S.C. §120.

FIELD OF THE INVENTION

This invention relates to dollies, and in particular to a kneeling dolly with ramp brake.

BACKGROUND OF THE INVENTION

Dollies have long been used to transport heavy vehicles. They are especially useful where a vehicle such as a car or an aircraft must be translated sideways in a restricted space such as a garage or hangar. In such cases, the vehicle's wheels are placed upon dollies having swiveling castors, and the vehicle may then be pushed in any direction.

EXISTING DESIGNS

One dolly design used for this purpose incorporated four swiveling wheels and a wheel platform. The vehicle to be placed upon the dolly was then jacked up, one wheel at a time, and each vehicle wheel lowered onto a corresponding dolly, one by one. This method was slow and cumbersome, and required the use of an independent jack. Another solution was a dolly which incorporated a two-tanged horizontal fork, which was attached to a vertical jack. The vertical jack was of the ratchet variety, similar to an automobile tire-changing jack. The two tangs were spaced at a distance less than the vehicle wheel diameter. In practice, the two tangs were slipped under a vehicle wheel, and then the vertical jack was actuated to lift the vehicle wheel out of contact with the garage or hangar surface. These steps were repeated for all the vehicle wheels, and then the dollies with swivel wheels could be used to move the vehicle in any direction desired. One problem that this arrangement suffered from was the difficulty in raising and lowering heavy vehicles. In the case of an aircraft, it was not unusual for several individuals to have to push upwards on the wings of the aircraft in order to be able to ratchet the associated main gear up and down, because the ratchet mechanism of the jack required excessive force to actuate. Another drawback of this apparatus was that the tires were only supported by the two tangs. After a while, wheel deformation could occur.

SUMMARY OF THE INVENTION

Accordingly, it is an object of the present invention to provide a kneeling dolly with ramp brake which is capable of supporting a vehicle and moving it in any desired direction across a surface. Design features allowing this object to be accomplished include a plurality of kneeling dollies comprising several swiveling wheels attached to a body having a wheel well. Advantages associated with the accomplishment of this object include enhanced garage/hangar utility and increased convenience.

It is another object of the present invention to provide a kneeling dolly with ramp brake which is easily driven up onto. Design features allowing this object to be accomplished include retractable front wheels and a ramp. Benefits associated with the accomplishment of this object include increased convenience and simplicity.

It is still another object of this invention to provide a kneeling dolly with ramp brake which automatically immobilizes when its front wheels are retracted. Design features enabling the accomplishment of this object include retractable front wheels and a body comprising a ramp which is in contact with a surface upon which the kneeling dolly with ramp brake rests when the front wheels are retracted, thus providing a frictional brake to the kneeling dolly with ramp brake. Advantages associated with the realization of this object include ease of operation and operator safety.

It is another object of the present invention to provide a kneeling dolly with ramp brake whose front wheels are extended or retracted with the turning of a single threaded rod. Design features allowing this object to be accomplished include a pair of retractable front wheels attached at opposite ends of a connecting rod, and a linkage connecting the threaded rod to the connecting rod. Benefits associated with the accomplishment of this object include simplicity and ease of operation, along with the associated time and money savings.

It is still another object of this invention to provide a pair of kneeling dolly with ramp brakes, one left-handed and one right-handed. Design features enabling the accomplishment of this object include a first kneeling dolly with ramp brake with its threaded rod, thrust bearing housing and actuator arm disposed on its left side, and a second kneeling dolly with ramp brake with its threaded rod, thrust bearing housing and actuator arm disposed on its right side. Advantages associated with the realization of this object include flexibility and ease of use, because the pair of kneeling dollies with ramp brake is set up to be used opposite sides of a vehicle, along with the associated time and cost savings.

It is yet another object of this invention to provide a kneeling dolly with ramp brake which is affordable. Design features allowing this object to be achieved include the use of off-the-shelf components and the use of readily available materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Five sheets of drawings are provided. Sheet one contains FIGS. 1 and 2. Sheet two contains FIG. 3. Sheet three contains FIG. 4. Sheet four contains FIG. 5. Sheet five contains FIG. 6.

DETAILED DESCRIPTION OF THE PREFERRED EMBODIMENT

Figure 1:
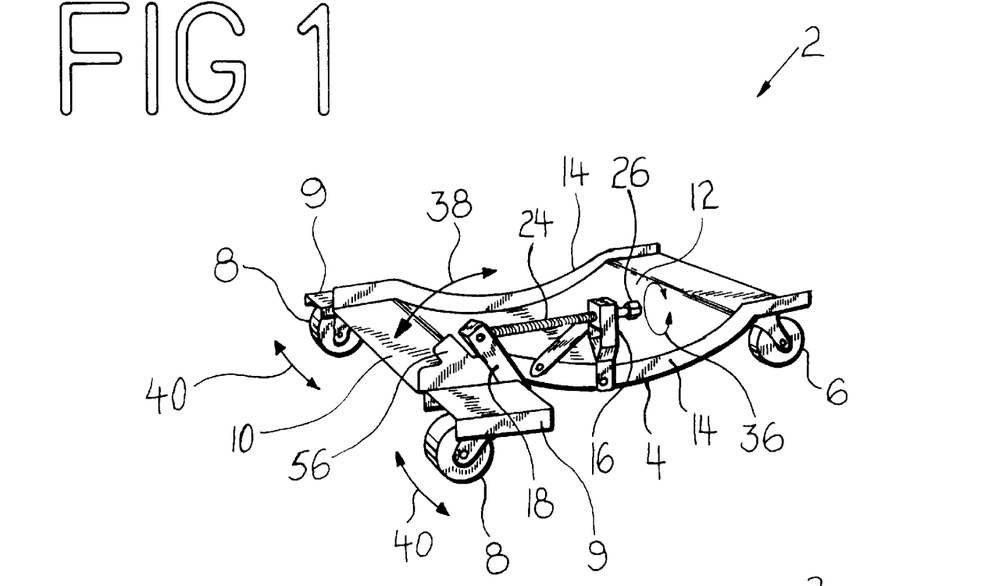
FIG. 1 is a front quarter isometric view of a kneeling dolly with ramp brake.

FIG. 1 is a front quarter isometric view of kneeling dolly with ramp brake 2. Kneeling dolly with ramp brake 2 comprises rear wheels 6 swivellably attached to body 4, and front wheels 8 swivellably and retractably attached to an extreme of body 4 opposite rear wheels 6. Body 4 further comprises ramp 10 leading into wheel well 12. Ramp 10 and wheel well 12 are bordered by sidewalls 14, which help constrain a vehicle wheel 32 within ramp 10 and wheel well 12.

Figure 2:
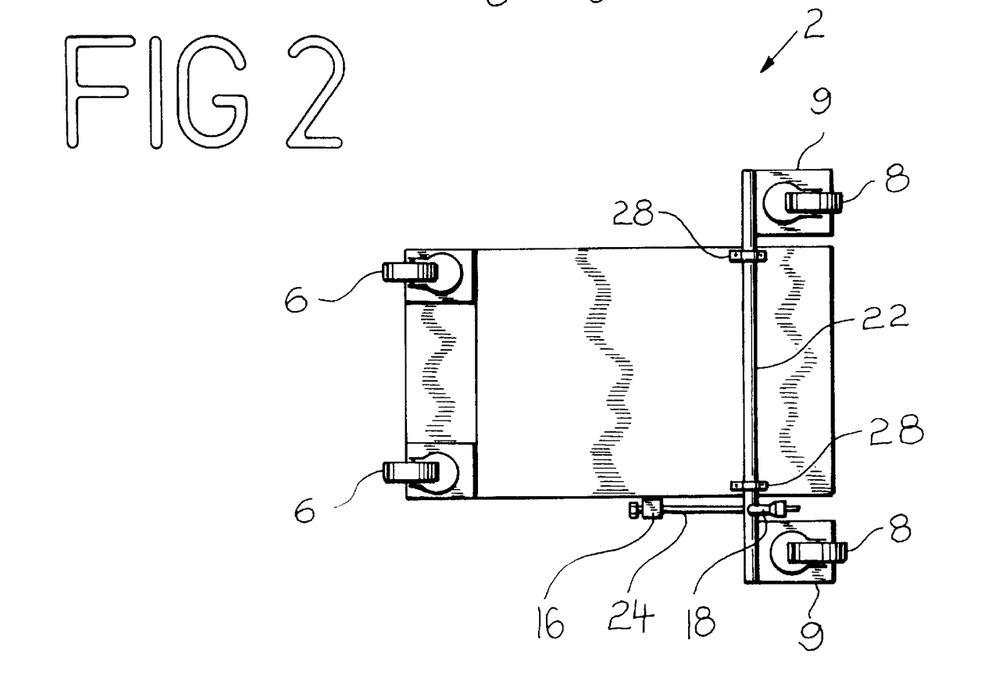
FIG. 2 is a bottom plan view of a kneeling dolly with ramp brake.

Referring now also to FIG. 2, a bottom plan view of kneeling dolly with ramp brake 2, front wheels 8 are mutually attached via connecting rod 22. Connecting rod 22 is rotatably attached to body 4 by means of connecting rod bushings 28. Specifically, each front wheel 8 is swivellably attached to a front wheel base 9. A first front wheel base 9 is rigidly attached to one extreme of connecting rod 22, a second front wheel base 9 is rigidly attached to an extreme of connecting rod 22 opposite the first front wheel base 9. The two front wheel bases 9 are substantially coplanar.

Means to extend and retract front wheels 8 is provided. The means to extend and retract front wheels 8 comprises actuator arm 18 rigidly attached to connecting rod 22, actuated by threaded rod 24. A non-threaded end of threaded rod 24 is rotatably attached to thrust bearing housing 16 by means of thrust bearing 17. See also FIG. 6. Thrust bearing housing 16 is rigidly attached to body 4. A threaded extreme of threaded rod 24 is threaded through nut 21. Nut 21 is rotatably attached to an extreme of actuator arm 18 opposite connecting rod 22. The non-threaded extreme of threaded rod 24 terminates in threaded rod hex 26, which facilitates turning threaded rod 24 as illustrated by arrow 36 in FIG. 1.

Thus, referring to FIG. 1, turning threaded rod 24 as indicated by arrow 36 causes the extreme of actuator arm 18 opposite connecting rod 22 to reciprocate as indicated by arrow 38. In turn, the rigid attachment between actuator arm 18 and connecting rod 22 causes connecting rod 22 to rotate within connecting rod bushings 28 relative to body 4, and thereby extend and retract front wheels 8 as indicated by arrows 40. The non-threaded extreme of threaded rod 24 is constrained from axial movement relative to body 4 by thrust bearing 17, which is attached to body 4 by means of thrust bearing housing 16.

Figure 6:
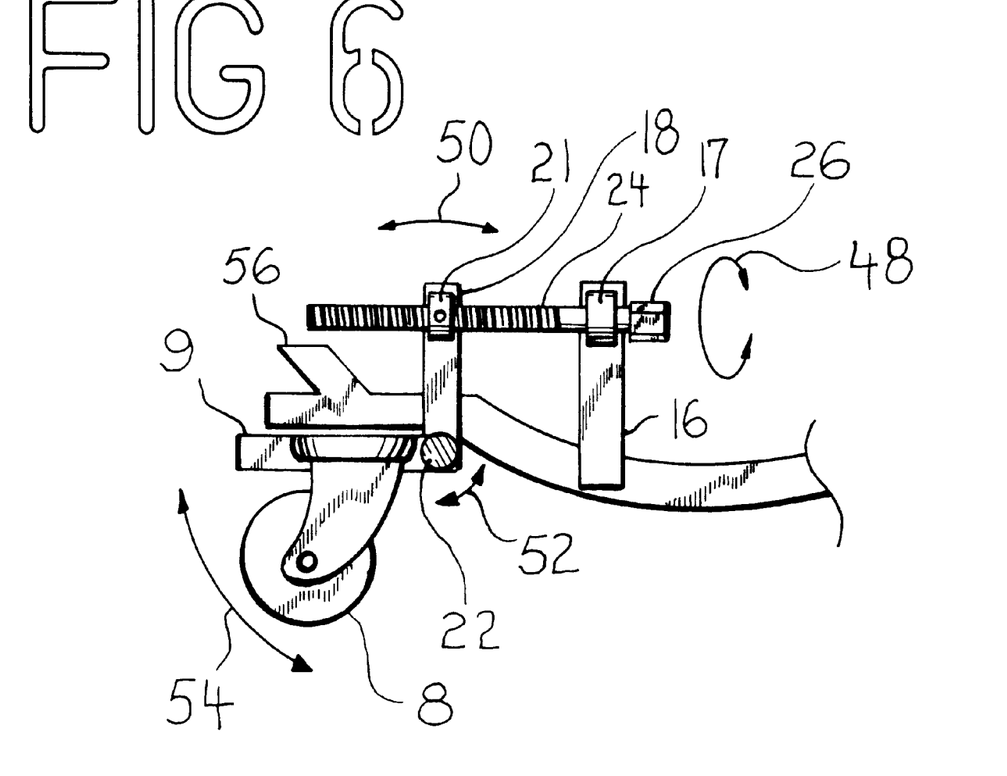
FIG. 6 is a side cut-away view of a kneeling dolly with ramp brake showing the arrangement of the threaded rod relative to the thrust bearing and actuator arm, and the rotational attachment of the nut to the actuator arm.

Similarly, referring to FIG. 6, turning threaded rod hex 26 as indicated by arrow 48 causes nut 21 to translate along threaded rod 24 as indicated by arrow 50. The rotatable attachment between nut 21 and the extreme of actuator arm 18 opposite connecting rod 22 causes connecting rod 22 to rotate relative to body 4 as indicated by arrow 52. In turn, the rotation of connecting rod 22 extends or retracts front wheels 8 as indicated by arrow 54.

Thus, an important aspect of the instant invention is that a single means to extend and retract front wheels 8 acts on both front wheels 8, because their front wheel bases 9 are mutually attached by means of connecting rod 22. This feature simplifies and speeds the operation of kneeling dolly with ramp brake 2, and guarantees that at all times, both front wheels 8 will be extended or retracted to the same degree, thus providing important stability and safety.

In operation, front wheel 8 extension is complete when the underside of kneeling dolly with ramp brake 2 contacts a surface upon which kneeling dolly with ramp brake rests. Retraction is complete when actuator arm 18 rotates into close proximity to actuator arm stop 54 (but is not yet touching actuator arm stop 54). Actuator arm stop 54 is rigidly attached to body 4, and is disposed substantially coplanar with a portion of actuator arm 18.

Figure 3:
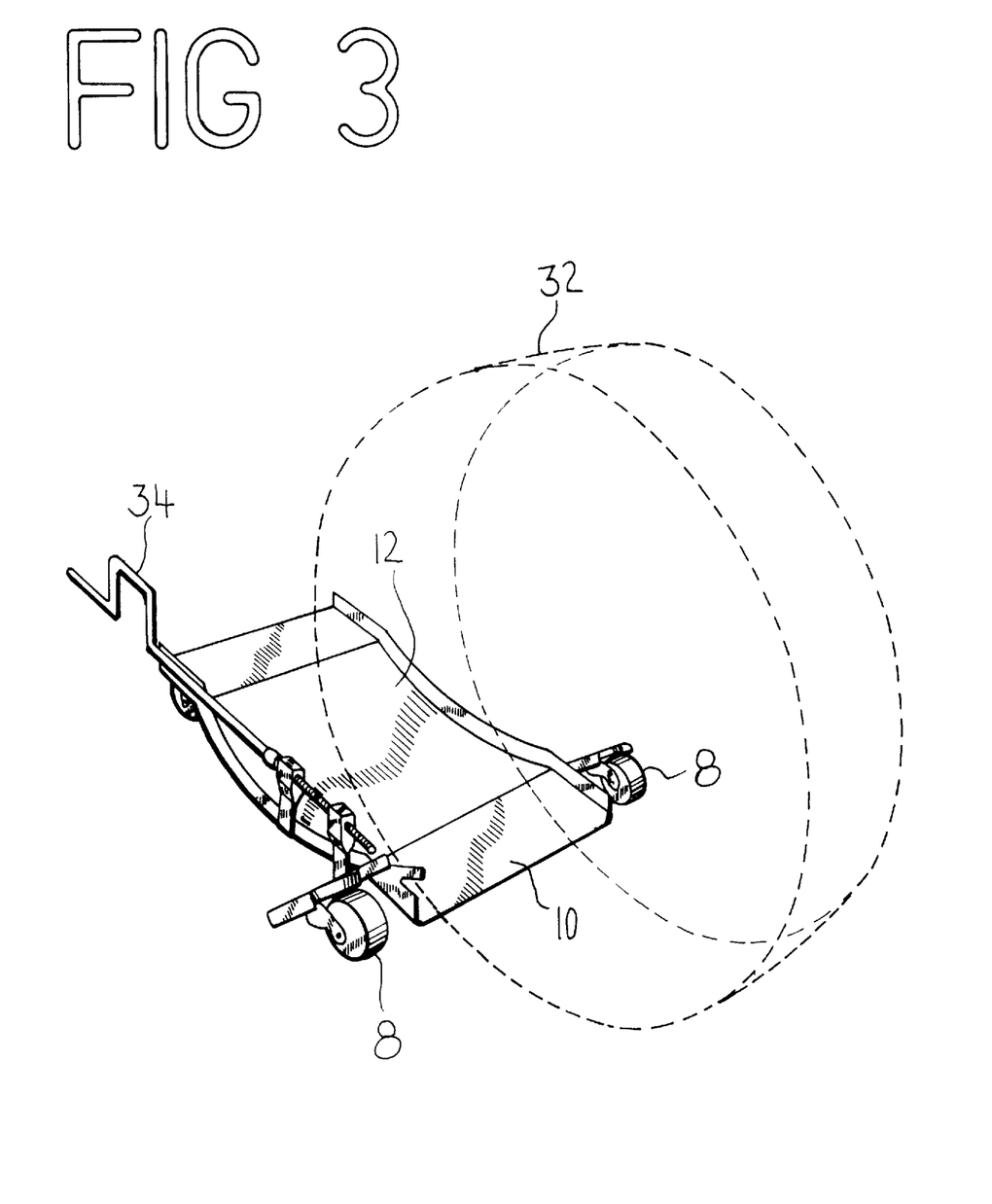
FIG. 3 is a front quarter isometric view of a kneeling dolly with ramp brake with a wheel actuating its ramp brake.
Figure 4:
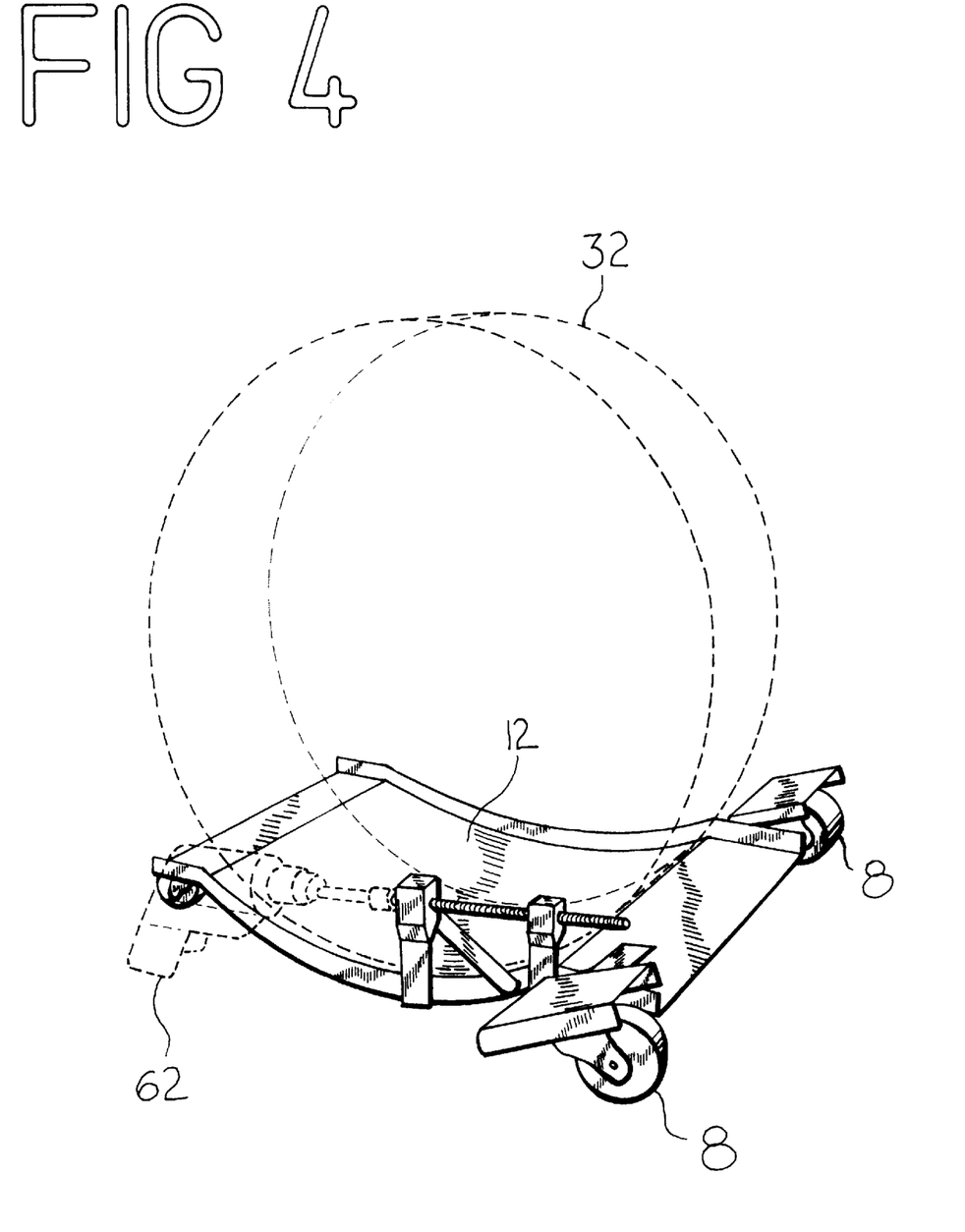
FIG. 4 is a front quarter isometric view of a kneeling dolly with ramp brake with a vehicle wheel disposed within its wheel well, and its front wheels half extended.
Figure 5:
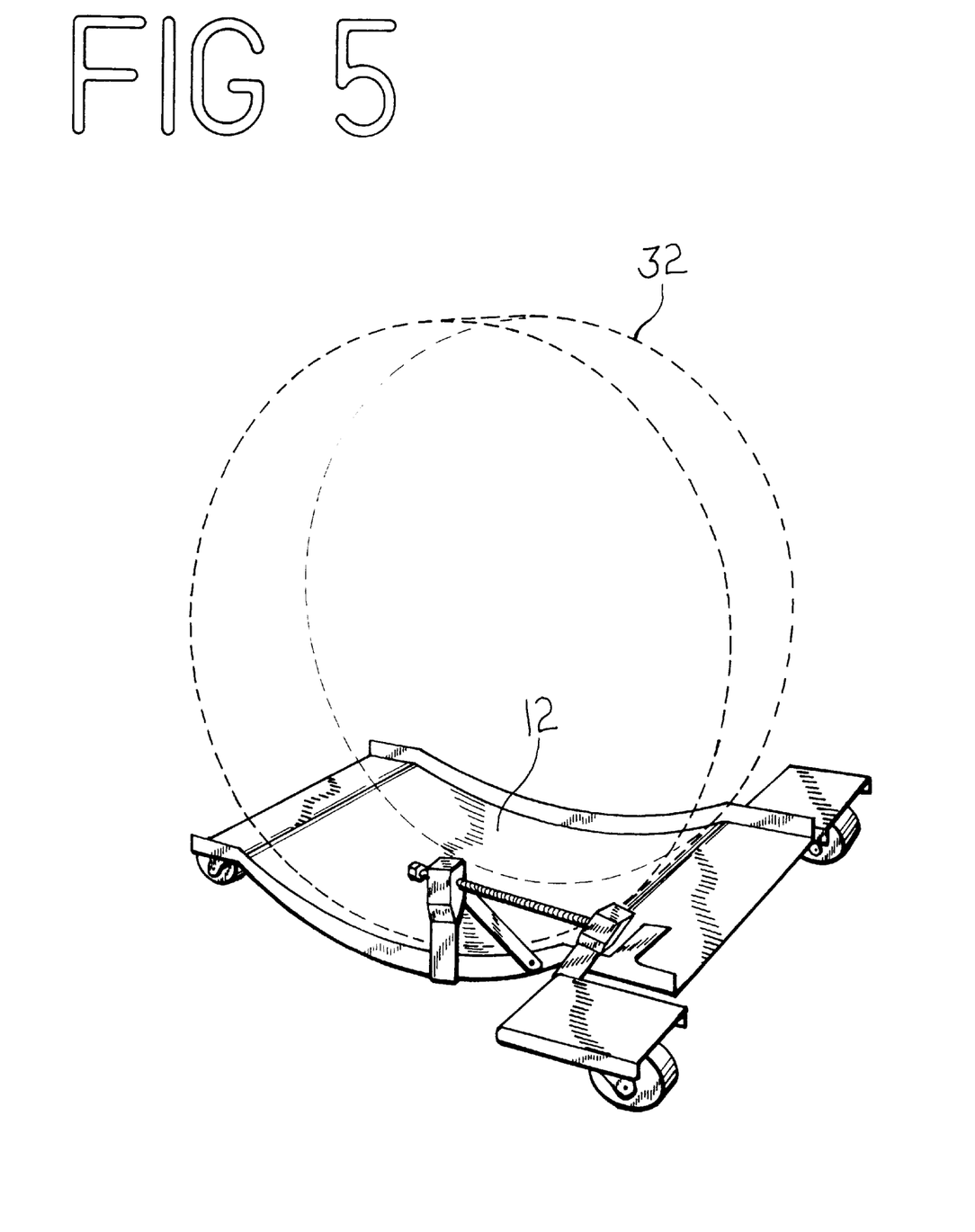
FIG. 5 is a front quarter isometric view of a kneeling dolly with ramp brake with a vehicle wheel disposed within its wheel well, and with its front wheels in the fully extended position.

FIGS. 3–5 depict the operation of kneeling dolly with ramp brake 2 in driving a vehicle wheel 32 onto kneeling dolly with ramp brake 2, and then extending front wheels 8 so that the vehicle can be easily moved about in any direction, due to the swivellable nature of the attachment between front wheels 8 and rear wheels 6 to body 4.

As may be observed in FIG. 3, body 4 comprises ramp 10 leading to wheel well 12. When front wheels 8 are retracted and swiveled away from connecting rod 22, the underside of kneeling dolly with ramp brake 2 is in contact with a surface upon which kneeling dolly with ramp brake 2 rests. Under the weight of wheel 32, the edge of ramp 10 opposite wheel well 12 contacts with, and presses firmly against the surface upon which kneeling dolly with ramp brake 2 rests. This contact provides a frictional brake to kneeling dolly with ramp brake 2, to prevent its moving relative to the surface upon which it rests.

This ramp brake feature of kneeling dolly with ramp brake 2 is an important aspect of the instant invention, because it prevents kneeling dolly with ramp brake 2 from rolling (or shooting!) out from under vehicle wheel 32 when an attempt is made to roll vehicle wheel 32 over ramp 10 into wheel well 12. This important ramp brake feature increases ease and safety of operation of kneeling dolly with ramp brake 2, and correspondingly saves time and money.

Before extending or retracting front wheels 8, and before rolling vehicle wheel 32 onto or off of kneeling dolly with ramp brake 2, front wheels 8 must be swiveled so as to be oriented perpendicular to, and pointing away from, connecting rod 22.

As depicted in FIGS. 3 and 4, a variety of aids may be used to help turn threaded rod 24. FIG. 3 depicts crank 34 being used for this purpose. FIG. 4 shows electric drill 62 being used. It has been found that a ⅜ inch reversible drill works well for this purpose. An impact wrench should not be used.

FIG. 4 is a front quarter isometric view of kneeling dolly with ramp brake 2 with a vehicle wheel 32 disposed within its wheel well 12, and its front wheels 8 half extended. An electric drill 62 is being used to aid extension of front wheels 8. FIG. 5 is a front quarter isometric view of kneeling dolly with ramp brake 2 with a vehicle wheel 32 disposed within its wheel well 12, and with its front wheels 8 in the fully extended position. Where a vehicle has one kneeling dolly with ramp brake 2 thus installed under each of its vehicle wheels 32, the vehicle may now be moved in any direction, due to the swivellable attachment between front wheels 8 and rear wheels 6 to body 4.

Operation:

FIGS. 3–5 depict wheel 32 being rolled onto kneeling dolly with ramp brake 2, and then the extension of front wheels 8 so as to be able to move the vehicle about. The steps are as follow:

A. Swiveling front wheels 8 so they are disposed perpendicular to, and pointing away from, connecting rod 22;

B. Turning threaded rod 24 until an underside of kneeling dolly with ramp brake 2 contacts a surface upon which kneeling dolly with ramp brake 2 rests;

C. Rolling a wheel 32 onto ramp 10, causing ramp 10 to press firmly on a surface upon which kneeling dolly with ramp brake 2 rests, thereby creating a brake in ramp 10;

D. Rolling wheel 32 into wheel well 12; and

E. Extending front wheels 8 by turning threaded rod 24 until actuator arm 18 rotates into close proximity with actuator arm stop 56.

The above steps are repeated for as many kneeling dollies with ramp brake 2 as are required to lift the vehicle, one per vehicle wheel 32. A vehicle can be driven up onto all kneeling dollies with ramp brake 2 at once, or singly or in pairs, depending on the wishes of the operator. For example in the case of a four-wheeled vehicle, kneeling dollies with ramp brake 2 may be placed immediately in front of all four wheels, and the vehicle simply driven until all four vehicle wheels 32 repose within their respective wheel wells 12. Alternatively, the front wheels and the rear wheels may be driven into their respective wheel wells 12 in pairs. In such case, the non-drive wheels should be driven into their respective wheel wells 12 first, followed by the drive wheels.

The following steps are followed to move a vehicle wheel 32 out of its wheel well 12:

F. Swiveling front wheels 8 so they are disposed perpendicular to, and pointing away from, connecting rod 22;

G. Retracting front wheels 18 by turning threaded rod 24 until the underside of kneeling dolly with ramp brake 2 contacts a surface upon which kneeling dolly with ramp brake 2 rests;

H. Rolling wheel 32 out of wheel well 12 and over ramp 10, causing ramp 10 to press firmly on a surface upon which kneeling dolly with ramp brake 2 rests, thereby creating a brake in ramp 10; and I. Rolling wheel 32 off ramp 10 and thus off of kneeling dolly with ramp brake 2, onto the surface upon which kneeling dolly with ramp brake 2 rests.

In the preferred embodiment there were a pair of rear wheels 6 present, but it is contemplated to be within the scope of the instant invention that kneeling dolly with ramp brake 2 incorporate a single rear wheel 6, or alternately, two or three or more rear wheels 6.

While a preferred embodiment of the invention has been illustrated herein, it is to be understood that changes and variations may be made by those skilled in the art without departing from the spirit of the appending claims.

| DRAWING ITEM INDEX | |
|---|---|
| 2 | kneeling dolly with ramp brake |
| 4 | body |
| 6 | rear wheel |
| 8 | front wheel |
| 9 | front wheel base |
| 10 | ramp |
| 12 | wheel well |
| 14 | sidewall |
| 16 | thrust bearing housing |
| 17 | thrust bearing |
| 18 | actuator arm |
| 21 | nut |
| 22 | connecting rod |
| 24 | threaded rod |
| 26 | threaded rod hex |
| 28 | connecting rod bushing |
| 32 | vehicle wheel |
| 34 | crank |
| 36 | arrow |
| 38 | arrow |
| 40 | arrow |
| 48 | arrow |
| 50 | arrow |
| 52 | arrow |
| 54 | arrow |
| 56 | wheel actuator arm stop |
| 62 | drill |

I claim:

1. A kneeling dolly with ramp brake comprising:
   a body comprising a wheel well disposed adjacent to a ramp, whereby a vehicle wheel disposed on said kneeling dolly with ramp brake is prevented from rolling off:
   at least one rear wheel;
   a pair of front wheels swivellably attached to respective wheel bases adjacent said ramp, each said wheel base being rigidly attached to one extreme of a connecting rod, the two wheel bases being substantially mutually coplanar, said connecting rod being rotatable attached to said body, whereby rotation of said connecting rod causes both said front wheels to extend or retract in concert; and
   a means to extend and retract said pair of front wheels, whereby when said pair of front wheels is retracted, a lower surface of said body contacts a surface upon which said kneeling dolly with ramp brake rests, thus creating a frictional ramp brake, said means to extend and retract said pair of front wheels comprising a threaded rod, one extreme of said threaded rod being rotatably attached to said body, an opposite extreme of said threaded rod being threadably connected to a nut, said nut being rotatably attached to one extreme of an actuator arm, an extreme of said actuator arm opposite said nut being rigidly attached to said connecting rod, whereby rotation of said threaded rod causes said nut to translate axially on said threaded rod, thus causing said connecting rod to rotate relative to said body, thereby extending or retracting said pair of front wheels, whereby a lever effect of said actuator arm and a force augmenting effect of said threaded rod reduces an amount of force required to rotate said threaded rod in order to extend or retract said pair of front wheels.

2. The kneeling dolly with ramp brake of claim 1 wherein said body further comprises an actuator arm stop disposed substantially coplanar with a portion of said actuator arm, whereby an extended position of said actuator arm may be indicated.

3. The kneeling dolly with ramp brake of claim 2 wherein said threaded rod is rotatably attached to one extreme of a thrust bearing housing by means of a thrust bearing, and an extreme of said thrust bearing housing opposite said threaded rod is rigidly attached to said body.

4. The kneeling dolly with ramp brake of claim 2 further comprising a crank and a means of removably attaching said crank to said threaded rod, whereby extension and retraction of said pair of front wheels is facilitated.

5. The kneeling dolly with ramp brake of claim 2 further comprising a drill and a means of removably attaching said drill to said threaded rod, whereby extension and retraction of said pair of front wheels is facilitated.

6. The kneeling dolly with ramp brake of claim 5 wherein said means of removably attaching said crank and said drill to said threaded rod comprises a threaded rod hex rigidly attached to said threaded rod.

7. The kneeling dolly with ramp brake of claim 2 wherein said connecting rod is rotatably attached to said body by means of at least one connecting rod bushing.

8. The kneeling dollies with ramp brake of claim 1 wherein each said body further comprises an actuator arm stop disposed substantially coplanar with a portion of said actuator arm, whereby an extended position of said actuator arm may be indicated.

9. A first kneeling dolly with ramp brake and a second kneeling dolly with ramp brake designed to mutually cooperate when being used together, each said kneeling dolly with ramp brake comprising:
   a body comprising a wheel well disposed adjacent a ramp whereby vehicle wheels disposed on the kneeling dollies with ramp brake are prevented from rolling off;

at least one rear wheel;

a pair of front wheels swivellably attached to respective wheel bases adjacent said ramp, each said wheel base being rigidly attached to one extreme of a connecting rod, the wheel bases pertaining to each said kneeling dolly with ramp brake being substantially mutually coplanar, said connecting rod being rotatable attached to said body, whereby rotation of said connecting rod causes both said front wheels pertaining to a given kneeling dolly with ramp brake to extend or retract in concert; and a means to extend and retract said pair of front wheels disposed on a first side of said first kneeling dolly with ramp brake, and a similar means to extend and retract said pair of front wheels disposed on a corresponding opposite side of said second kneeling dolly with ramp brake, whereby said first kneeling dolly with ramp brake may be used in association with a first vehicle wheel, and said second kneeling dolly with ramp brake may be used in association with a second vehicle wheel, the first and second vehicle wheels being disposed on opposite sides of a vehicle, the means to extend and retract said pair of front wheels comprising a threaded rod, one extreme of said threaded rod being rotatably attached to said body, an opposite extreme of said threaded rod being threadably connected to a nut, said nut being rotatably attached to one extreme of an actuator arm, an extreme of said actuator arm opposite said nut being rigidly attached to said connecting rod, whereby rotation of said threaded rod causes said nut to translate axially on said threaded rod, thus causing said connecting rod to rotate relative to said body, thereby extending or retracting the pair of front wheels pertaining to a given kneeling dolly with ramp brake, whereby a lever effect of each said actuator arm and a force augmenting effect of each said threaded rod reduces an amount of force required to rotate each said threaded rod in order to extend or retract each said pair of front wheels.

10. A method of moving a vehicle on a plurality of kneeling dollies with ramp brake, each said kneeling dolly with ramp brake comprising:

a body comprising a ramp disposed adjacent a wheel well;

at least one rear wheel;

a pair of front wheels swivellably attached to said body adjacent said ramp; and a means to extend and retract said pair of front wheels comprising a threaded rod, one extreme of said threaded rod being rotatably attached to said body, an opposite extreme of said threaded rod being threadably connected to a nut, said nut being rotatably attached to one extreme of an actuator arm, an extreme of said actuator arm opposite said nut being rigidly attached to said connecting rod, and an actuator arm stop rigidly attached to said body, whereby rotation of said threaded rod causes said nut to translate axially on said threaded rod, thus causing said connecting rod to rotate relative to said body, thereby extending or retracting the pair of front wheels pertaining to a given kneeling dolly with ramp brake, whereby a lever effect of said actuator arm and a force augmenting effect of said threaded rod reduces an amount of force required to rotate said threaded rod in order to extend or retract said pair of front wheels; said method comprising the following steps, which pertain to each said kneeling dolly with ramp brake:

A. Swiveling said front wheels so they are disposed perpendicular to, and pointing away from, said connecting rod;

B. Turning said threaded rod until an underside of said kneeling dolly with ramp brake contacts a surface upon which said kneeling dolly with ramp brake rests;

C. Rolling a vehicle wheel onto said ramp, causing said ramp to press firmly on a surface upon which the kneeling dolly with ramp brake rests, thereby creating a frictional brake in said ramp;

D. Rolling said vehicle wheel into said wheel well;

E. Retracting said front wheels by turning said threaded rod until said actuator arm rotates into close proximity with said actuator arm stop; and F. Pushing said vehicle in any desired direction, facilitated by the swivellable nature of the attachment of the front and rear wheels to their respective kneeling dolly with ramp brake.

11. The kneeling dolly with ramp brake of claim 10 wherein said method further comprises the following steps which pertain to each said kneeling dolly with ramp brake:

G. Swiveling said front wheels so they are disposed perpendicular to, and pointing away from, said connecting rod;

H. Retracting said front wheels by turning said threaded rod until an underside of said kneeling dolly with ramp brake contacts a surface upon which said kneeling dolly with ramp brake rests;

I. Rolling said vehicle wheel out of said wheel well and over said ramp, causing said ramp to press firmly on the surface upon which said kneeling dolly with ramp brake rests, thereby creating a frictional brake in said ramp; and J. Rolling said vehicle wheel off said ramp and thence completely off of said kneeling dolly with ramp brake, onto the surface upon which said kneeling dolly with ramp brake rests.

* * * * *

UNITED STATES PATENT AND TRADEMARK OFFICE
CERTIFICATE OF CORRECTION

PATENT NO. : 6,179,542 B1  
DATED : January 30, 2001  
INVENTOR(S) : Haven

Page 1 of 1

It is certified that error appears in the above-identified patent and that said Letters Patent is hereby corrected as shown below:

Abstract,  
Line 5, "Devices..." should read "Means..."

Figure 4,  
Part of the ghost line representing a vehicle wheel is missing in the upper left hand area.

Figure 5,  
Part of the ghost line representing a vehicle wheel is missing in the upper left hand area.

Column 6,  
Line 7, "...rotatable..." should read "...rotatably..."

Claim 12 (Application claim 15) should be included:  
"Claim 12. The kneeling dolly with ramp brake of claim 1 wherein each said body further comprises an actuator arm stop disposed substantially coplanar with a portion of said actuator arm, whereby an extended position of said actuator arm may be indicated."

Signed and Sealed this

Thirtieth Day of October, 2001

*Attest:*

NICHOLAS P. GODICI  
*Attesting Officer*     *Acting Director of the United States Patent and Trademark Office*